INVENTOR.
KJELL FRANK

United States Patent Office 3,555,397
Patented Jan. 12, 1971

3,555,397
THYRISTOR CURRENT CONVERTER WITH MEANS FOR RAPIDLY EXTINGUISHING THE LOAD CURRENT
Kjell Frank, Vasteras, Sweden, assignor to Allmanna Svenska Elektriska Aktiebolaget, Vasteras, Sweden, a corporation of Sweden
Filed Apr. 23, 1969, Ser. No. 818,736
Claims priority, application Sweden, Apr. 29, 1968, 5,764/68
Int. Cl. H02m 7/00, 7/52
U.S. Cl. 321—5                           3 Claims

ABSTRACT OF THE DISCLOSURE

In a thyristor current converter having a control pulse device for delivering control pulses to the main thyristors, and at least one extinguishing circuit for extinguishing each thyristor at the end of its conducting interval, and having an oscillator for controlling the operating rate of the control pulse device and the extinguishing circuit, the load current is rapidly extinguished by an arrangement which first blocks the control pulses to the main thyristors and second regulates the control signal applied to the oscillator so that the oscillator frequency is higher during the blocking interval than immediately prior thereto. The blocking interval is sufficient to permit the extinguishing circuit to extinguish all of the thyristors.

BACKGROUND OF THE INVENTION

(1) Field of the invention

The present invention relates to a means in a thyristor current converter in which a control pulse device is arranged to deliver control pulses to the main thyristors of the current converter, in which at least one extinguishing circuit is arranged to extinguish each thyristor at the end of its conducting interval and in which an oscillator is arranged to control the operating rate of the control pulse device and the extinguishing circuit and thus the frequency of the output voltage of the current converter, the frequency of the oscillator being variable depending on the control signal supplied to it.

(2) The prior art

The invention thus relates to a current converter having its own commutation means and operating primarily as rectifier. Such converters are used, for example, in the operation of asynchronous or synchronous motors, the speed of which can then be varied by altering the frequency of the output voltage of the converter. In a typical case the frequency can be altered between 1 Hz. and 50 Hz. In many cases it is necessary to be able to alter the direction of rotation of the motor and this can be done by switching the phase sequence of the output voltage of a multiphase current converter and this in turn can be carried out in a manner known per se by switching the commutation sequence of the main thyristors of the current converter, that is, those thyristors which carry the load current. An alteration in the direction of rotation is preferably carried out by successively decreasing the frequency to a low value, after which the phase sequence is reversed and the frequency increased with opposite phase sequence. The switching should take place when the main thyristors are currentless. This state is achieved in known manner by blocking the control pulses to the main thyristors so that no new thyristors are ignited and permitting the extinguishing circuit or circuits to continue to extinguish the current-carrying thyristors at the normal rate. The switching cannot take place with safety until all the thyristors have been extinguished, which requires a certain time. Each thyristor can at the most be conducting for half an alternating voltage period. In a current converter where each thyristor is provided with its own extinguishing circuit, therefore, the switching must be delayed at least one-half period which, at low frequencies, is such a long time that it constitutes a serious disadvantage from the point of view of regulation. In, for example, a converter where an extinguishing circuit common to all the thyristors extinguishes all the thyristors at each commutation, for certain extinguishing of the thyristors in, for example, a three-phase converter a time is needed corresponding to one-sixth of a period. Even this is in many cases an impermissibly long delay at low frequencies.

It is in any case for converters of the above-mentioned type extremely desirable to achieve rapid extinguishing of the load current. Upon a powerful increase in this current, closed for example by a short-circuit in the alternating current network being fed or the load object, an otherwise unavoidable blown fuse can be avoided if the load current can be rapidly extinguished.

SUMMARY OF THE INVENTION

The invention relates to a current converter in which this advantageous result can be achieved, thus eliminating the above-mentioned disadvantages of the known current converters.

A current converter according to the invention is characterised in that a control means is arranged, in order to rapidly extinguish the load current of the current converter, at least for a certain interval firstly to block the control pulses to the main thyristors and secondly to influence the control signal supplied to the oscillator so that the oscillator frequency during the interval is higher than the frequency immediately prior to the start of the interval, the length of said interval being so chosen in relation to the oscillator frequency during this interval that the extinguishing circuit during the interval can extinguish all the main thyristors.

According to a further development of the invention concerning a polyphase current converter, in which a switching means, in accordance with an order signal supplied to it, determines the phase sequence of the output voltage of the current converter by determining the order in which the control pulses are supplied to the thyristors, the order signal for switching the phase sequence is arranged to influence the switching means and also influence the control means to block the control pulses and increase the oscillator frequency. In this way the main thyristors can be extremely rapidly extinguished and a rapid switching of the phase sequence obtained.

In current converters where the switching means operates rapidly, as is the case with an electronic switch, according to one embodiment of the invention, a delay means is arranged to delay switching of the phase sequence so long that switching only takes place after the control member has with certainty had time to block the control pulses.

BRIEF DESCRIPTION OF THE DRAWINGS

In the following the invention will be described further with drawings.

In the drawings, FIG. 1a shows a current converter circuit of common type for feeding a motor type while

FIG. 1a shows the principle of a current converter known per se for feeding an asynchronous motor 1. The converter can be divided into the main circuit 2 which, through commutation reactors 3 and 4, is connected to a direct voltage source 20 and the extinguishing circuit 5. The main circuit comprises the six main thyristors 211, 212, etc. and the six feedback and commutating diodes 213, 214, etc. By igniting and extinguishing the thyristors a three-phase square voltage is generated in known manner which, possibly through overtone filters, not shown, is supplied to the motor 1. The extinguishing circuit 5 comprises the extinguishing capacitor 51, the charging thyristors 541–544 and the extinguishing thyristors 551–554. The capacitor is charged from the direct voltage source 50, for example by igniting the thyristors 541 and 544, thus obtaining a positive potential on the lefthand side. When the extinguishing thyristors 552 and 553 are then ignited, the capacitor is discharged through those of the thyristors 211, 221 and 231 which are conducting and through the diodes from the group 214, 224 and 234 pertaining to these conducting thyristors, so that the thyristors in the upper half of the current converter are extinguished. By using the two other pairs of charging and extinguishing thyristors the main thyristors in the lower half can be extinguished. Each main thyristor shall be ignited once and extinguished once per alternating current period, the extinguishing circuit in the three phase converter shown thus performing six extinctions per period, alternately in the upper and lower half of the thyristor circuit. Two extinctions are necessary for all the main thyristors to be certainly extinguished and this requires a time corresponding to one third of a period.

FIG. 1b shows the control circuits of the current converter schematically. An oscillator 6 with variable frequency, for example a unijunction transistor oscillator emits pulses with a frequency which is six times as great as the desired frequency of the output voltage and which is controlled by the output voltage from the operation amplifier 7. In this a control voltage $f_0$ corresponding to the desired frequency of the output voltage is added to a signal $\Delta f$ which, upon operation with unaltered phase sequence of the output voltage, is zero. The pulse train from the oscillator 6 controls a member 8 for control of the thyristors of the extinguishing circuit 5, the member consisting, for example, of a bi-stable circuit. The pulse train also controls a member 10 by way of the normally conducting electronic contact 9, in order to control the thyristors of the main circuit (2), this member consists, for example of a ring counter having six outputs. These are connected to the control electrodes of the main thyristors through a switching means 11, possibly through pulse-amplifying and/or pulse shaping means, not shown. The switching member determines the phase sequence of the output voltage of the converter by determining the sequence in which the ignition pulses are supplied to the main thyristors, which it does in accordance with a phase-sequence determining signal A which can assume two distinct values, each corresponding to a certain phase sequence. The signal A is supplied to the switching means 11 through a delay circuit 12 with a delay of $\tau_2$. It is also supplied through the front and rear edge deriving circuits 13 and 14 to the mono-stable circuit 15 which has the reset time $\tau_1$. This is normally in zero position, but is set in 1-position by an alteration in A so that the signal $\Delta f$ is supplied to the amplifier 7 and the contact 9 is blocked. If the direction of rotation of the motor 1 is to be altered $f_0$ is first reduced, for example by a control system not shown in the drawings, to a low value, in a typical case corresponding to a frequency of the output voltage of 1 Hz. After this the control pulses to the main thyristors may be blocked and, when these are extinguished, switching of the phase sequence can take place. As mentioned above the extinguishing process requires one-third of a period, that is at 1 Hz. one-third of a second. The circuit shown decreases this time considerably. At an alteration in the phase-sequence determining signal A the monostable circuit 15 is set in its 1-position and the control pulses to the main thyristors are blocked by the contact 9.

After the time $\tau_2$, as long as the blocking needs, the switching means 11 switches to the opposite phase sequence. When the circuit 15 is set in its 1-position the signal $\Delta f$ is added to $f_0$. $\Delta f$ may be chosen high, in the case described for example 50–100 times as great as $f_0$. The extinguishing circuit now operates with the frequency $(f_0+\Delta f)$ and has in an extremely short time, some milliseconds, extinguished both halves of the main circuit. The reset time $\tau_1$ of the circuit 15 is chosen so long that the extinguishing circuit during this time and with an operating frequency corresponding to $(f_0+\Delta f)$ can with certainty extinguish the main thyristors, but no longer. After the time $\tau_1$ the monostable circuit 15 returns to zero position, $\Delta f$ becomes zero, the contact 9 becomes conducting, control pulses are supplied once more to the main thyristors and the current converter starts to operate with the frequency $f_0$ and with the new phase sequence.

Figure 1A:
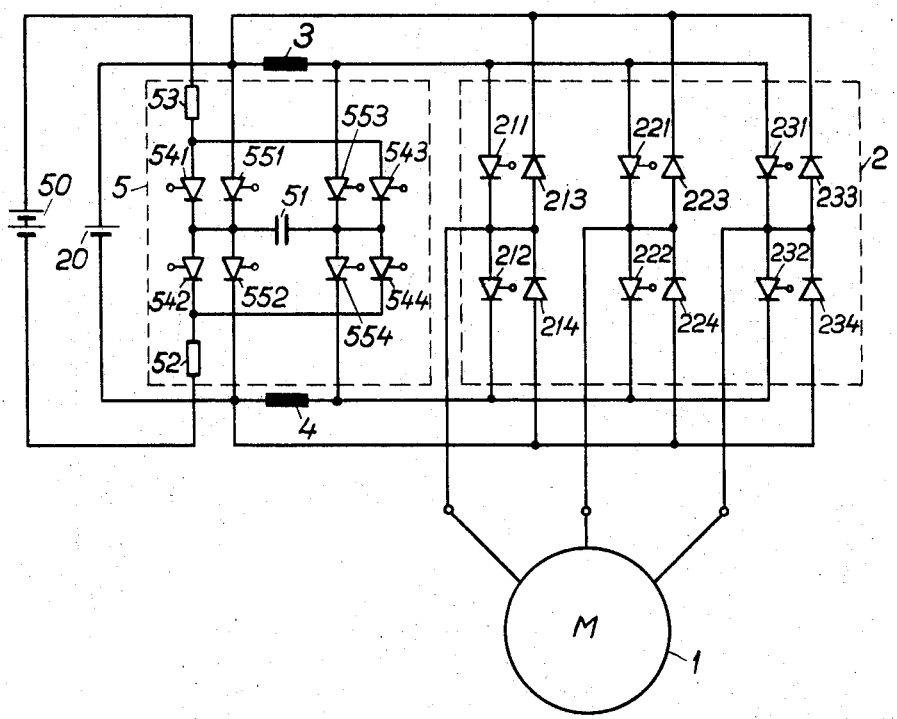
Figure 1B:
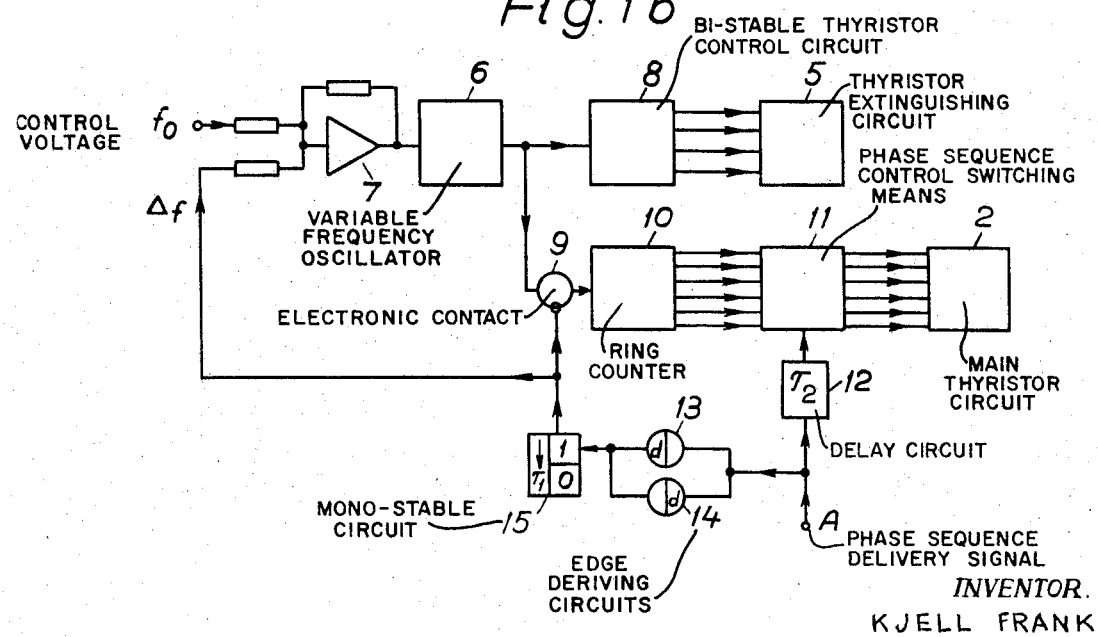
FIG. 1b shows a circuit according to the invention.

The invention is applicable to many other types of current converters besides that described. Similarly, the control circuits shown in FIG. 1b are only examples and may be designed in many other ways within the scope of the invention.

I claim:

1. In a thyristor current converter in which a control pulse device is arranged to deliver control pulses to the main thyristors of the current converter, in which at least one extinguishing circuit is arranged to extinguish each thyristor at the end of its conducting interval and in which an oscillator is arranged to control the operating rate of the control pulse device and the extinguishing circuit and thus the frequency of the output voltage of the current converter, the frequency of the oscillator being variable depending on the control signal supplied to it the improvement comprising means for rapidly extinguishing the load current of the current converter, said extinguishing means including means operative at least for a certain interval firstly to block the control pulses to the main thyristors and secondly to regulate the control signal supplied to the oscillator to make the oscillator frequency during the interval higher than the frequency immediately prior to the start of the interval, the length of said interval in relation to the oscillator frequency existing during this interval being such that the extinguishing circuit during the interval can extinguish all the main thyristors.

2. In a polyphase current converter according to claim 1, in which a switching means, in accordance with an order signal supplied to it, determines the phase sequence of the output voltage of the current converter by determining the order in which the control pulses are supplied to the thyristors, the improvement which comprises means to feed the order signal to the switching means to control the switching means and also to the control means to cause the control means to block the control pulses and increase the oscillator frequency.

3. In a polyphase current converter according to claim 2, a delay means in the means feeding the order signal to the switching means to delay switching of the phase sequence until the control means has blocked the control pulses.

References Cited

UNITED STATES PATENTS

| 3,219,905 | 11/1965 | Davis et al. | 321—45C |
| 3,360,709 | 12/1967 | Etter | 321—5 |
| 3,388,310 | 6/1968 | Etter | 321—45C |
| 3,399,336 | 8/1968 | Koppelmann | 321—5 |

WILLIAM M. SHOOP, Jr., Primary Examiner

U.S. Cl. X.R.

321—40, 45